United States Patent [19]

Moody et al.

[11] Patent Number: 5,245,262
[45] Date of Patent: Sep. 14, 1993

[54] HYBRID CONTROL LAW SERVO CO-PROCESSOR INTEGRATED CIRCUIT

[75] Inventors: Kristaan L. Moody, Nottingham; Paul W. Latham, II, Lee, both of N.H.

[73] Assignee: Allegro Microsystems, Inc., Worcester, Mass.

[21] Appl. No.: 912,387

[22] Filed: Jul. 13, 1992

[51] Int. Cl.$^5$ ............................................. G05B 11/01
[52] U.S. Cl. ..................................... 318/560; 318/569; 318/601; 318/604
[58] Field of Search ................. 318/601, 604, 560, 569

[56] References Cited

U.S. PATENT DOCUMENTS

| | | | |
|---|---|---|---|
| 4,437,046 | 3/1984 | Foillace | 318/571 |
| 4,498,063 | 2/1985 | Makabe et al. | 333/173 |
| 4,843,289 | 6/1989 | Mogi et al. | 318/600 |
| 4,866,779 | 9/1989 | Kennedy et al. | 381/94 |
| 4,956,831 | 9/1990 | Sarraf et al. | 360/78 |

*Primary Examiner*—William M. Shoop, Jr.
*Assistant Examiner*—Karen Masih

[57] ABSTRACT

A digitally programmable integrated-circuit analog-signal servo co-processor has digital programming contact pads to which an external microprocessor may be connected, has analog-signal input pads and analog-signal output pads, and includes a plurality of programmable analog-signal-manipulating circuits (ASMC's). Each of the ASMC's has input and output terminals connected to an input programmable-switch matrix so that one or a combination of the ASMC blocks may be connected between the analog-signal input and output contact pads of the integrated circuit. Certain ASMC blocks have microprocessor programmable transfer functions, e.g. ASMC integrator, notch filter, low pass filter, PD compensator and voltage divider. Key ones of those ASMC blocks are discrete-time circuits including switched-capacitor resistors and have transfer functions wherein the parameters are ratios of capacitances and the switching rate frequency to provide accurate and stable performance. This versatile system of digitally programmable circuit configurations and digitally programmable analog (ASMC) transfer functions provides a hybrid analog and digital servo co-processor having high speed, versatility and stability and a low power consumption.

15 Claims, 5 Drawing Sheets

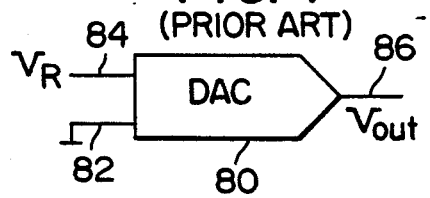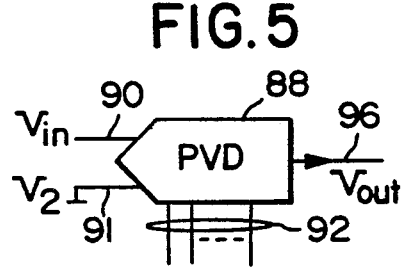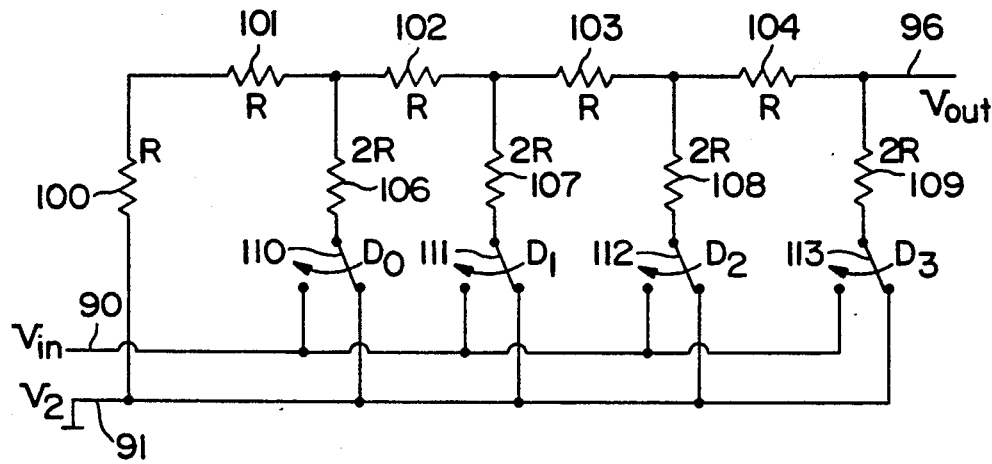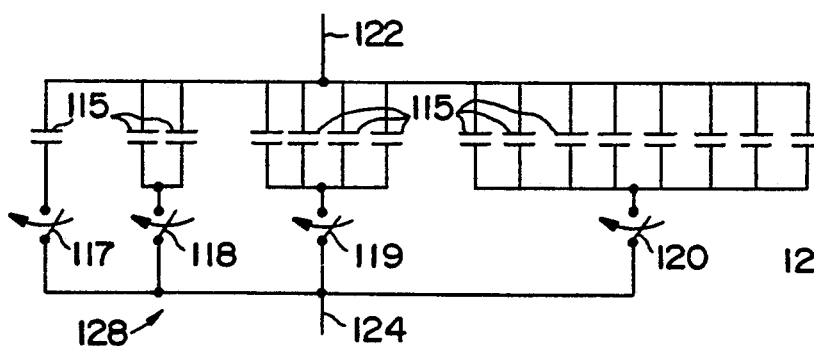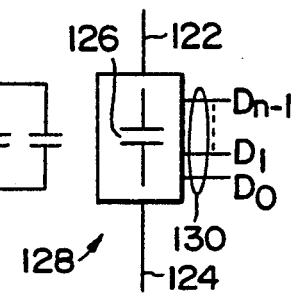

HYBRID CONTROL LAW SERVO CO-PROCESSOR INTEGRATED CIRCUIT

BACKGROUND

This invention relates to servo compensators, and more particularly pertains to an integrated circuit analog-signal co-processor having a digitally programmable circuit configuration and a digitally programmable transfer-function.

Traditional approaches to servo system design use either analog signal processing or digital signal processing for establishing the servo compensator transfer function, or control law. The elementary servo system of FIG. 1 includes a servo compensator 10, motor 12, motion and/or position mechanical to electrical transducer 14 and a summer 16. The input command signal is most often an analog signal and when the compensator is of the digital signal-handling type, the input command line must include an analog-to-digital converter.

There has recently been seen a dramatic increase in the complexity of servos, especially for computer disk memory drives. And, the pressure for improved disk drive performance has notably increased, e.g. demand for high speed, without giving up accuracy, degrading versatility or diminishing reliability.

Servo compensators include at minimum a filter circuit for "shaping" the response of the motor control signal. But servo compensators are usually used in conjunction with a lead or prediction circuit. A commonly used lead or prediction circuit is a proportional-derivative (PD) compensator circuit or a proportional-integration-derivative (PID) compensator circuit to account for the inertia and momentum of the motor toward greater speed and accuracy. Many times the compensator also includes a notch filter of center frequency equal to a principal mechanical vibration frequency of the motor-load.

One recent refinement has a simple microprocessor that in response to the measured parameters of the motor-load, status will program the compensator filter's frequency response to optimize control loop performance. The compensator is then thought of as a servo co-processor compensator.

Servo co-processors of the prior art, with the exception of the motor driver, have been entirely implemented by digital circuity whereby both the compensator and its microprocessor-associated programming circuits are all built using the same compatible technology and processes, e.g. CMOS. However, it becomes difficult and expensive to achieve analog-signal sampling rates higher than about 100 KHz, partly because of the delays introduced by the required analog-to-digital converters (ADC's) through which the analog command signal is introduced to the compensator, and partly because digital arithmetic operations are time consuming. Digital-signal processors typically have a clock rate of 2 KHz.

It is therefore an object of this invention to provide a faster and more broadly competent integrated-circuit servo-compensator co-processor that is also capable of providing high accuracy and stability, especially for use in disk drives.

SUMMARY OF THE INVENTION

A digitally programmable integrated-circuit analog-signal servo co-processor has pluralities of input contact pads, output contact pads and digital programming contact pads to which an external microprocessor may be connected. Alternatively the microprocessor may be included in the co-processor integrated circuit chip. The servo co-processor further includes a plurality of analog-signal-manipulating circuits (ASMC). Each of the ASMC's has an input terminal, an output terminal, and a group of digital-programming terminals that are connected to a set of the co-processor digital programming contact pads. Each of the ASMC's is for accepting at the ASMC input terminal an analog signal, is and for manipulating the analog input signal in analog form and producing at the ASMC output terminal an analog signal that is a particular analog-signal-manipulating function of the input analog signal. The particular analog-signal-manipulating function uniquely corresponds to a particular digital programming signal that may be addressed to the group of ASMC programming terminals.

Key ones of the ASMC's are each a discrete-time circuit, including at least one switched-capacitor resistor of the kind including a charge transferring capacitor and dual-phase clocked switches for simulating a linear ohmic resistor. Each key ASMC also includes at least one programmable capacitor array connected to the corresponding group of ASMC programming terminals for effecting the particular analog-signal-manipulating function in response to the digital programming signal.

An input switch-matrix has a plurality of input-matrix analog-signal-input terminals, one group of the input-matrix input terminals is connected to the co-processor input pads and a another group of the input-matrix input terminals are connected respectively to the ASMC output terminals. A plurality of input-matrix output terminals are respectively connected to the input terminals of the plurality of ASMC's.

The input switch-matrix is for making switch connection between certain ones of the input-matrix analog-signal-input terminals and particular ones of the input-matrix output terminals when a corresponding digital signal is applied to the input-matrix programming terminals. An input digital-signal matrix-programming bus connects the input-matrix programming terminals to a group of the co-processor digital programming pads.

Key ones of the ASMC's are discrete-time integrators, discrete-time notch filters and discrete-time proportional-differential (PD) circuits. Other ASMC's are a summing circuit, and a programmable voltage divider.

The servo co-processor may additionally include an output switch-matrix having a plurality of inputs connected respectively to the ASMC outputs, a plurality of outputs connected respectively to a group of the co-processor output contact pads, and a group of digital programming terminals connected to a group of the co-processor digital programming input contact pads. The output-matrix is for internally making switch connection between certain ones of the output-matrix input terminals and particular ones of the output-matrix-output terminals when a corresponding digital signal is applied to the output-matrix programming terminals.

The switch matrices of this integrated co-processor can be built to be capable of programmably connecting any ASMC block with any other(s) and capable of programmably connecting any one or any combination of ASMC's between the input and output contact pads of the co-processor, and thereby providing a variety of co-processor transfer function types. In practice and in the interest of economy, a co-processor designed for any particular servo system will not likely be built with its full potential capabilities, i.e. for programmably connecting any combination of matrix inputs and outputs over all permutations of inputs to inputs, outputs to outputs and inputs to outputs.

The integrated circuit servo compensator co-processor of this invention is intended to be supplied the appropriate digitial programming signals preferably from an external microprocessor that is to receive its instructions from the user (e.g. the servo system designer). This microprocessor can also be connected to servo-motor velocity and position sensors and may, via digital programming signals to the servo compensator, make appropriate dynamic changes in the parameters of the compensator transfer function for enhanced performance during servo operation.

All of the critical transfer-function parameters of the programmable ASMC blocks may be adjusted in accordance with instructions programmed into the microprocessor by the user. The user may thereby optimize operation of this broadly programmable servo co-processor with respect to any one of a wide variety of servo motors and loads, (a) by changing the topology of the co-compensator circuit and (b) by adjusting parameters of ASMC transfer functions e.g. adjusting a programmable ASMC integrator bandwidth, or the center frequency of a programmable ASMC notch filter to exactly reject the frequency at which the particular motor-load combination resonates.

This servo co-processor compensator employs discrete-time analog-signal manipulating circuits (ASMC's) which are capable of operation at high sampling rates, e.g. over 1 MHz, and offers the significant speed advantage, provided by conventional analog-signal handling compensators, in combination with great versatility and stability approaching that of digital-signal handling compensators.

BRIEF DESCRIPTION OF THE DRAWINGS

FIG. 4 shows a conventional block symbol for a digital to analog converter (DAC).

FIG. 5 shows a block symbol employed herein for a conventional DAC connected for use as a digitally programmable voltage divider (PVD). The addition of an arrow distinguishes it as a PVD and indicates the direction of signal flow through it.

FIG. 6 shows a PVD circuit adapted from a standard R/2R DAC that is especially well suited for use in some embodiments of this invention.

FIG. 7 shows a circuit diagram of a suitable digitally programmable capacitor array for use in the embodiments of this invention.

FIG. 8 shows a symbol representing a digitally programmable capacitor array such as that of FIG. 7.

DESCRIPTION OF THE PREFERRED EMBODIMENTS

Figure 1:
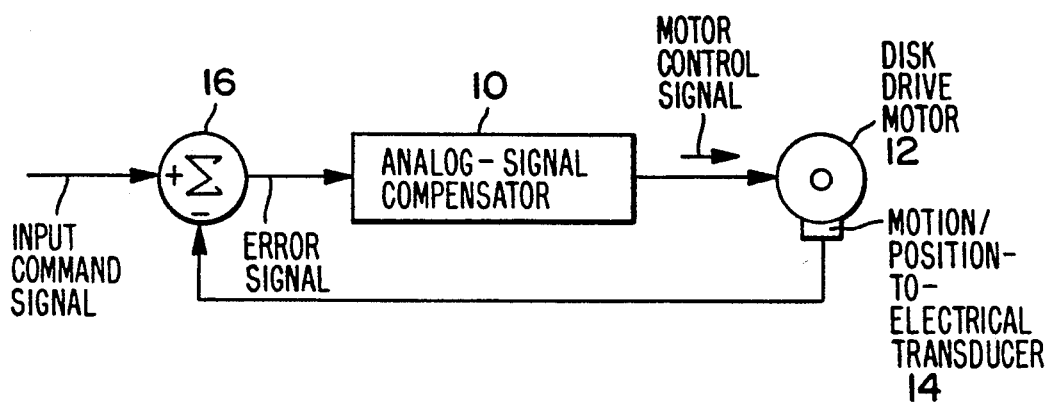
FIG. 1 shows a block diagram of an elementary servo system of the prior art employing an analog-signal compensator.
Figure 2:
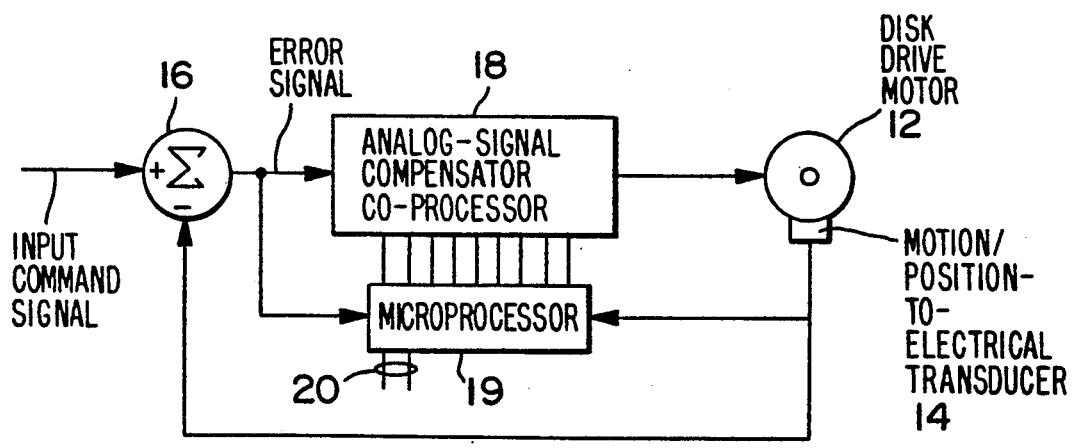
FIG. 2 shows a block diagram of an elementary servo system including an analog-signal compensator co-processor of this invention.

The servo system of FIG. 2 has a summer 16 having an input to which the analog motor command signal is delivered. The output of the co-processor 18 drives the motor 12. The motion and or speed of the motor 12 is detected by the mechanical to electrical transducer 14 which is connected to a subtractive input of the summer 16 which passes the difference or error signal to the input of the co-processor. The output of the motor motion/speed signals from the transducer 14 may also be connected as shown to an input of the microprocessor 19 which typically sends digital signals to the co-processor for dynamically choosing the appropriate co-processor filter circuit and dynamically setting the chosen filter circuit parameters that are appropriate for the conditions of speed and velocity of the motor while accounting for the magnitude of the error signal.

The microprocessor 19 also has additional input terminals 20 through which the designer of the servo system may program the microprocessor 19 to connect within the compensator co-processor 18 the choice of starting filter circuit and starting filter parameters, and to program the microprocessor how to react to the dynamic inputs from the error signal and from the motor.

Figure 3:
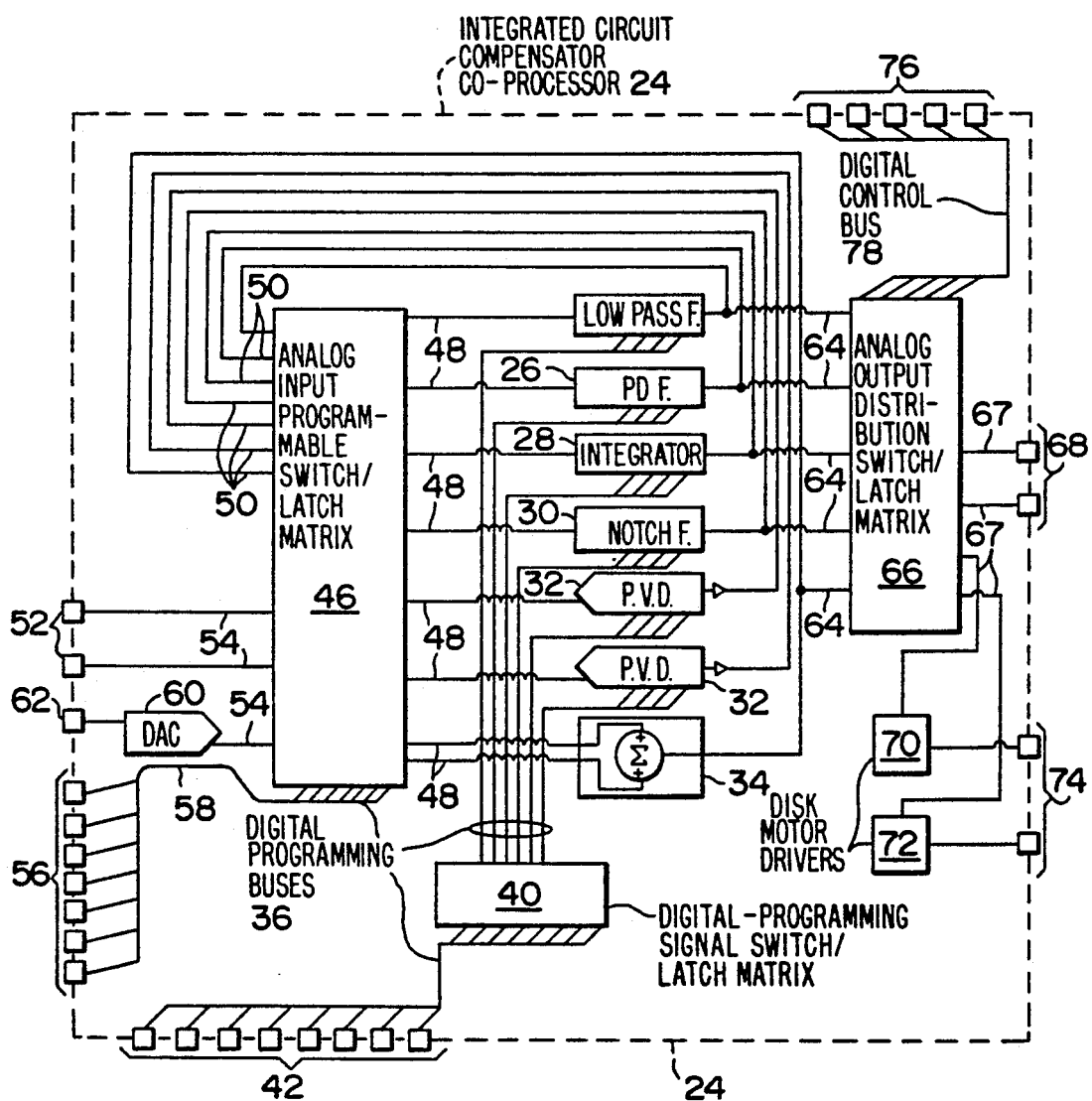
FIG. 3 shows a block diagram of an analog-signal compensator co-processor of this invention.

At the functional heart of the integrated circuit compensator co-processor 24 shown in FIG. 3, there are a number of separate blocks of analog-signal manipulating circuits (ASMC) e.g. 26, 28, 30, 32 and 34 providing different basic servo compensator circuit characteristics. The key ASMC circuits are the discrete-time circuits 26, 28 and 30, namely those that include switched-capacitor resistors. The critical parameters of each of the blocks 26, 28, 30 and 32 are digitally programmable by the microprocessor via digital programming busses 36. A switch-latch matrix 40 may be used to reduce the required number of co-processor digital programming contact pads 42.

The external microprocessor preferrably includes the oscillator or clock that is required by the sampling switches, e.g. switches of the switched-capacitor resistors in the discrete-time ASMC blocks 26, 28 and 30. This clock signal is delivered to the ASMC blocks via busses 46 and digital matrix 40. Matrix 40 or the ASMC blocks themselves may contain a frequency divider circuit for stepping down the clock frequency to a lower switched capacitor sampling frequency.

An analog-circuit-making switch/latch matrix 46 has outputs 48 connected to the inputs of the analog-signal manipulating circuits (ASMC) e.g. 26–34. The ASMC outputs are connected to certain analog inputs 50 of the analog-circuit-making switch/latch matrix 46. Analog servo command signals may be introduced to the co-processor via contact pads 52 which are connected to two analog inputs 54 of the switch/latch matrix 46. Switch/latch matrix 46 contains a matrix of switches and/or latches that are capable of being digitally programmed to connect one or several of the ASMC blocks into a servo compensator circuit, the digital programming being provided by the microprocessor (not shown) that is to be connected to co-processor contact pads 56 and thence via digital programming bus 58 to matrix 46.

For further versatility, a digital-to-analog-converter 60 is connected between a digital servo-command input signal contact pad 62 and an analog-signal matrix input 54, so that in situations in which a digital signal is generated by the disc motor sensor, it can be converted to analog form for direct use by the analog-signal co-processor.

Inputs 64 of a compensator-output-signal distribution switching matrix 66 are connected to the outputs of the ASMC blocks. Matrix 66 provides a programmable connection between the output(s) 67 of one or more ASMC blocks and a co-processor output contact pad 68. The input of an external disk motor driver circuit (not shown) may be connected to a pad 68.

Alternatively an output 67 of the switching matrix 66 is connected to the input of an internal motor driver circuit 70 or 72. The outputs of drivers 70 and 72 are connected to contact pads 74 to which a disk motor (not shown) may be connected. The switching of the matrix 66 is programmed by digital signals applied, e.g. from the microprocessor 19 of FIG. 2, to input programming pads 76 that are connected to the matrix 66 via digital programming bus 78.

In the integrated circuit co-processor 24, all of the programmable switches in the ASMC blocks 26, 28, 30, 32 and 34, and all of the switches/latches of the matrices 40, 46 and 66 are preferably of MOS construction. Likewise the operational amplifiers are also preferably of MOS construction to provide very high input impedances for greatest accuracy and efficiency in the discrete-time ASMC circuits.

DESCRIPTIONS OF CERTAIN ASMC BLOCKS

PVD

Digitally programmable voltage divider (PVD) circuits may be obtained by using standard digital-to-analog circuits (DAC's) in voltage mode. A conventional symbol 80 representing a DAC is shown in FIG. 4 with a DC voltage reference terminal 84, an analog-signal output terminal 86 and a ground terminal 82.

The DAC composite digital input terminal (not shown) consists of a group of input conductors for parallel application thereto of the digital input signal.

The symbol 88 of FIG. 5 is used here to represent a digitally programmable voltage divider (PVD). The PVD input terminal 90 was the DAC reference voltage terminal 84, the PVD group of digital programming terminals 92 was the DAC composite digital input terminal, and the PVD output terminal 86 was the DAC output terminal 96. A terminal 91 is the PVD circuit "ground" or voltage reference terminal that was the DAC ground terminal 82.

The preferred PVD circuit shown in FIG. 6 is a voltage-mode connected conventional "R/2R" DAC such as is shown on page 337 in the above-mentioned book by Tobey et al. The resistors 100, 101, 102, 103 and 104 each have a resistance value R. The resistors 106, 107, 108 and 109 each have a resistance value 2R. The digital-signal-activated switches 110, 111, 112 and 113 are preferably implemented as MOS transistors (not shown). A switch to which a binary zero is applied is connected contacts the ground (terminal 91), and a switch to which a binary 1 is applied swings to the left as shown and contacts the input (terminal 90). Thus for example, when the digital programming signal is 1/0/0/1, only switches 110 and 113 are connected to the input terminal 90 while the switches 111 and 112 are connected to the ground terminal 91. The corresponding decimal number is $N = D0 + 2D1 + 4D2 + 8D3 = 1 \cdot 1 + 2 \cdot 0 + 4 \cdot 0 + 8 \cdot 1 = 9$.

This R/2R programmable voltage divider advantageously has a Thevenin equivalent output source impedance equal to R ohms no matter how the switches are set.

The PVD output voltage Vout is seen to be a function of both the analog input voltage Vin and the digital programming signal, according to $$V_{out} = V_2 + (V_{in} - V_2)\frac{D0 + 2D1 + 4D2 + 8D}{16} = V_2 + (V_{in} - V_2)\frac{N}{2^n}$$

where n is the number of binary bits capacity of the programming terminal 92 and N is the decimal number corresponding to the digital programming signal applied to the programming terminal 92. Note that when the voltage $V_2$ at terminal 91 is zero, the divider output voltage Vo is always directly proportional to the input voltage Vin, and $$\frac{V_{out}}{V_{in}} = \frac{N}{2^n}.$$

In the case $n = 4$, N is an integer less than 16.

Each ASMC block 32, in the co-processor of FIG. 3, is comprised of a programmable voltage divider (PVD) which may also include and be connected in tandem with a fixed gain buffer amplifier (not shown) such that the transfer function of the ASMC PVD block 32 may have programmable values greater than unity.

PROGRAMMABLE CAPACITOR ARRAY

The digitally programmable capacitor array of FIG. 7 is binarily weighted. All of the capacitors 115 have the same capacitance value, C, and they are connected in binary groups of 1, 2, 4, etc. Electrically programmable switches 117, 118, 119 and 120 determine which groups of capacitors 115 contribute to the capacitance $C_A$ of the array as measured between terminals 122 and 124.

$$C_A = (D0 + 2D1 + 4D2 + 8D3)C$$

or more generally $C_A = MC$, wherein M is the decimal number corresponding to the digital programming signal that sets the switches 117 through 120. Here, the number of array programming bits, m, is just 4 whereas a greater number of bits will usually be preferred. M can be any integer between 0 and $2^m - 1$, so for $m = 4$, M can be any integer between 0 and 15.

The programmable capacitor array of FIG. 7 may be more simply represented by the symbol 128 of FIG. 8, wherein the programmed-array capacitor 128 has the value $C_A$, and the group of digital programming terminals is 130.

PROGRAMMABLE DISCRETE-TIME INTEGRATOR OR LOW PASS FILTER

Figure 9:
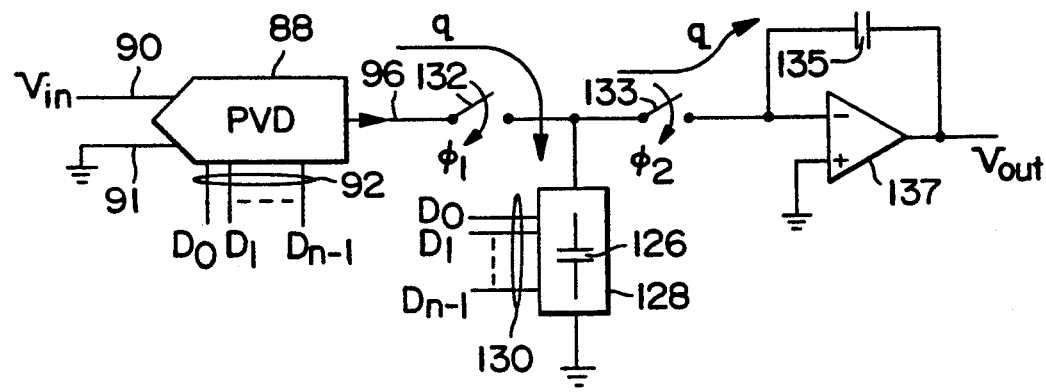
FIG. 9 shows a circuit diagram of a programmable discrete-time analog-signal manipulating circuit (ASMC) integrator of this invention.

The programmable analog-signal manipulating circuit of FIG. 9 is a programmable discrete-time (e.g. employing a switched-capacitor resistor) analog-signal integrator. The integrating resistor is a programmable switched-capacitor resistor made up of the programmable capacitor array 128 of FIG. 8 and the two clocked (sampling) switches 132 and 133. The effective ohmic value $R_S$ of a switched-capacitor resistor is $$R_s = 1/f_c \cdot C_s,$$

where $f_c$ is the switching rate (sample rate) and $C_s$ is the capacitance of the switched capacitor (128 in FIGS. 7 and 8).

A similar non-programmable switched-capacitor resistor is employed in the integrator circuit described by Makebe et al, in the U.S. Pat. No. 4,498,063 issued Feb. 5,, 1985. A programmable voltage divider 88 is connected at the input of the integrator.

At the end of any first half-clock period (sampling period), during which switch 132 is closed, for an instantaneous output voltage $v_R(t)$ at the output terminal 96 of the PVD 88, a charge q will have flowed through closed switch 132 into capacitor 128 of capacitance $C_A$. The same charge q will flow from the array capacitor 128 into the feedback capacitor 135 (of capacitance $C_F$) during the subsequent second half-clock period (phase 02) during which switch 133 is closed. This is more accurate for the conditions that the RC time constant of the PVD 88 and the array capacitor 128 (namely $R \cdot C_A$ is much less, e.g. at least 1:10, than the clock (sampling) frequency $f_c$), and for the condition that the capacitance $C_A$ is much less than $C_F$, e.g. at least 1:10.

The feedback capacitor 128 is preferably made up of a plurality of identical capacitors of the same construction and capacitance C as the capacitors 115 making up the capacitor array 128 of FIGS. 5 and 6, because in an integrated circuit, simultaneously manufactured capacitors of the same kind and size lead to better repeatability and predictability of capacitance ratios, e.g. $C_A/C_F$. Therefore in this embodiment, the fixed capacitance CF is set at the value $2^m C$, where m is the number of digital programming bits of the programmable capacitor array 128. Since for any given clock period the charges q in and out of the array capacitor 128 are the same, the charge transfer equations are:

$$dq = v_{in} \frac{N}{2^n} MC = -v_{out} 2^m C,$$

leading to the circuit gain expressions:

$$v_{out} = \frac{N}{2^n} \frac{MC}{2^m C} v_{in},$$

$$\frac{v_{out}}{v_{in}} = -\frac{MN}{2^{n+m}}$$

wherein $v_{in}$ and $v_{out}$ are respectively the instantaneous input and output voltages of the entire circuit of FIG. 9 during any full clock period.

The transfer function, in Laplace form, for the switched capacitor integrator circuit which is preceded by the PVD is:

$$\frac{V_{out}(S)}{V_{in}(S)} = \frac{N}{2^n} f_c \frac{C_A}{C_F} \frac{1}{S}, \text{ and}$$

$$\frac{C_F}{C_A} = \frac{MC}{2^m C} = \frac{M}{2^m}, \text{ leading to}$$

-continued
$$\frac{V_{out}(S)}{V_{in}(S)} = \frac{MN}{2^{n+m}} f_c \frac{1}{S}.$$

This last equation is the transfer fucntion of the full integrator circuit of FIG. 9. In it there appears the product of MN, the two decimal numbers corresponding respectively to the two digital-program inputs to the PVD 88 and the capacitor array 128. Note the very great gain range ($2^{n+m}$) that is achieved, as evidenced by the independently dual-programmable-parameter product, MN, in the circuit transfer function.

The ASMC block 28, in the co-processor of FIG. 3, is the integrator of FIG. 9.

Filed concurrently herewith is applicant's application entitled DIGITALLY DUAL-PROGRAMMABLE INTEGRATOR CIRCUIT, which describes this and other such dual programmable integrator circuits in more detail, and that application is incorporated by reference herein.

A PROGRAMMABLE DISCRETE-TIME NOTCH FILTER

Figure 10:
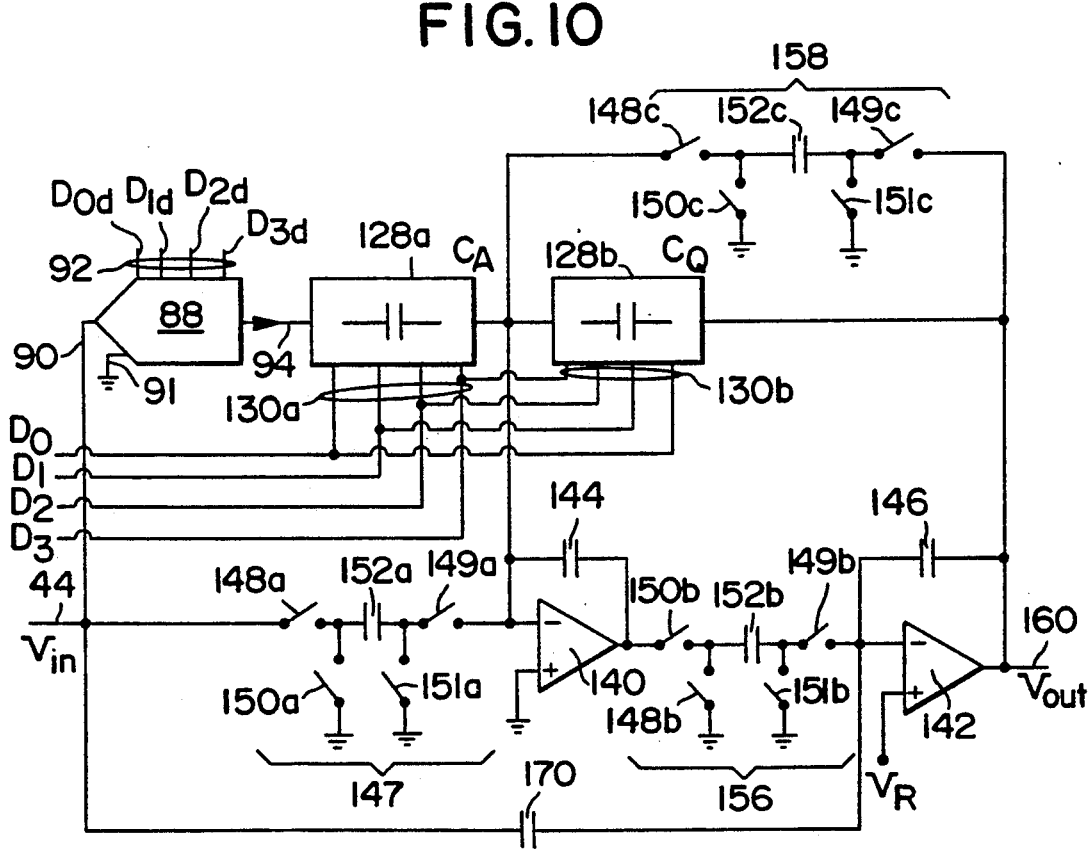
FIG. 10 shows a circuit diagram of a programmable discrete-time ASMC notch filter of this invention.

The programmable analog-signal manipulating circuit of FIG. 10 is a programmable notch filter. Operational amplifiers 140 and 142 have integrating capacitors 144 and 146 respectively, connected between each amplifiers's negative input and output. A first and positive switched-capacitor resistor circuit 147 is comprised of switches 148a, ,149a, 150a and 151a and capacitor 152a. Resistor 147 is connected between the filter input conductor 44 and the negative input of the amplifier 140. An output but negative switched-capacitor resistor 156 is comprised of switches 148b, 149b, 150b and 151b and capacitor 152b. Resistor 156 is connected between the output of the amplifier 140 and the negative input of the second amplifier 142.

A third and positive switched-capacitor resistor 158 is comprised of switches 148c, 149c, 150c and 151c and capacitor 152c. Resistor 158 is connected between the output of the amplifier 142, that corresponds to the filter output conductor 160, and the input of the first amplifier 142. A first programmable capacitor array 128b, of capacitance $C_Q$, having a group of digital programming terminals 130b, is connected between the filter output conductor 160 and the negative input of amplifier 140. A programmable capacitor array 128b, of capacitance $C_A$, having a group of digital programming terminals 130a, is connected in parallel with the switched capacitor 147. A feed forward capacitor 170 is connected between the filter input conductor 44 and the input of the second amplifier 142.

The programmable voltage divider (PVD) 88 is shown with a zero voltage applied to the reference, now the ground, terminal 91. The digital programming signal applied to the programming terminal 92 is designated D0d/D1d/D2d/D3d. The voltage divider ratio of the PVD 88 is $N/2^n$, as for the PVD of FIGS. 3 and 4.

The programmable capacitors 128a and 128b are identical with the capacitor 128 of FIG. 5 having the capacitance $C_A = MC$, and having the same digital programming signal D0/D1/D2/D3 applied simultaneously to both programming terminals 60 of capacitor arrays 128a and 128b.

Although not essential to the invention, the values of switching capacitors 152a, 152b and 152c are preferably of the same integrated circuit structure, e.g. MOS, and prefereably the same size and therefore the having the same value $C_s$ for optimum capacitance matching at manufacture. This also makes simpler the analysis of the circuit. For the same reason, the value of the capacitors 144, 146 and 170 are preferably set equal, at the capacitance Co. The notch filter circuit of FIG. 10 has a transfer function:

$$\frac{V_{out}}{V_{in}} = \frac{S^2 + MN\frac{1}{2^n}\frac{C}{C_o}\frac{1}{RC_o}S + \frac{1}{R^2 C_o^2}}{S^2 + M\frac{C}{C_o}\frac{1}{RC_o}S + \frac{1}{R^2 C_o^2}}.$$

This notch filter circuit is seen here to have a transfer function containing a composite parameter NM that is the product of two independently programmable parameters N and M. The decimal number N, corresponds to the digital programming signal to the capacitor arrays 128a and 128b, and the decimal number M corresponds to the digital programming signal to the PVD 88. Parameters M and N independently determine notch width and notch depth respectively.

The ASMC block 30 in the co-processor of FIG. 3 is the notch filter of FIG. 10.

Filed concurrently herewith is applicant's application entitled SWITCHED-CAPACITOR NOTCH FILTER WITH PROGRAMMABLE NOTCH WIDTH AND DEPTH, which describes such notch filters in more detail, and that application is incorporated by reference herein.

A PROGRAMMABLE DISCRETE-TIME PD/PID COMPENSATOR-FILTER

Figure 11:
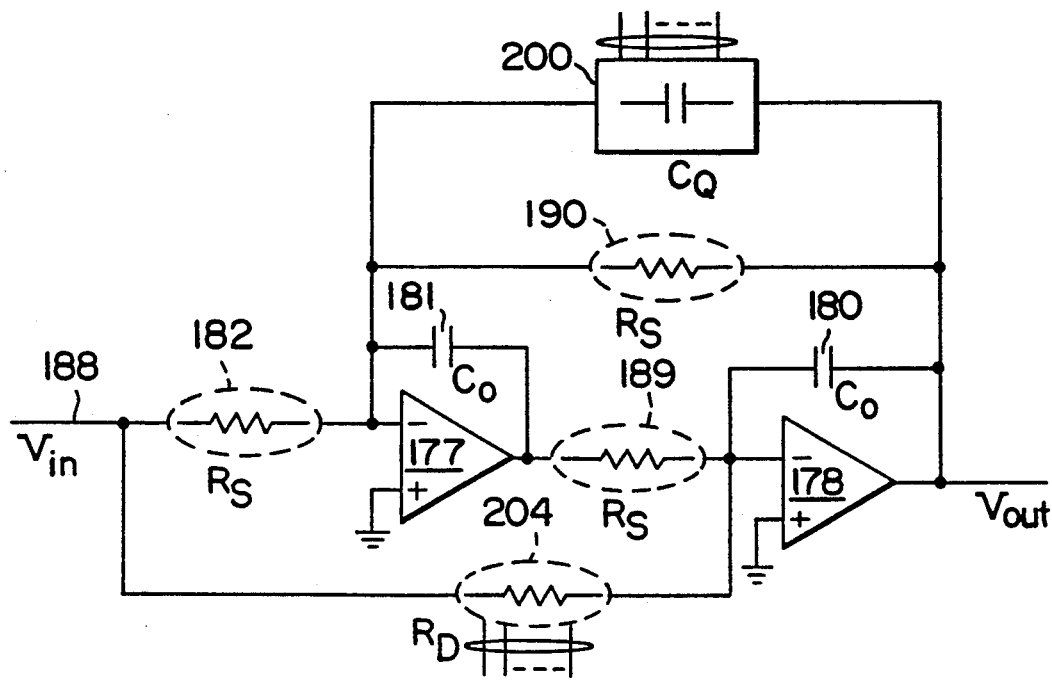
FIG. 11 shows a circuit diagram of a programmable discrete-time ASMC position-differential (PD) compensator of this invention.

The proportional-differential (PD) servo compensator circuit of FIG. 11 has two operational amplifiers 177 and 178. Capacitors 181 and 180, each with value Co, are connected respectively across the amplifiers 177 and 178, input to output. The analog signal Vin is applied to PD input conductor 188 that is connected via the switched-capacitor resistor 182 or value Rs to the input of the amplifier 177. Switched-capacitor resistors 189 and 190, indicated herein by the symbol formed by a resistor symbol encircled by an oval dashed line, also have the value Rs ohms.

A programmable capacitor array 200, of value $C_Q$, is connected in parallel with the resistor 190 for programmably determining the Q of the poles; and a programmable switched-capacitor resistor 204, of value $R_D$, determines the S-plane position of the zero. The switched capacitor (not shown) of switched-capacitor resistor 204 (of value $R_D$), has the value $C_D$. The PD transfer function of the PD compensator circuit of FIG. 11 is $$\frac{V_{out}}{V_{in}} = -\frac{\left[\frac{C_s}{C_o}f_c\right]^2}{\frac{C_s}{C_D}\cdot\frac{C_s}{C_o}f_c} \cdot \frac{S + \frac{C_s}{C_D}\cdot f_c\frac{C_s}{C_o}}{S^2 + \frac{\frac{C_s}{C_o}f_c}{\frac{C_o}{C_Q}}S + \left[f_c\frac{C_s}{C_o}\right]^2}$$

wherein $f_c$ is in radians and the position (corresponding to the signal frequency component in radians) of the poles in the S-plane, $$w_n = f_c\frac{C_s}{C_o},$$

the Q of the poles and therefore the bandwidth of the PD filter $$Q = \frac{C_o}{C_Q} \text{ and}$$

the S-plane position of the zero (corresponding to the frequency in radians) is $$w_Z = \frac{C_s}{C_D}w_n.$$

The transfer function of the PD compensator of FIG. 11 may therefore be rewritten as $$\frac{V_{out}}{V_{in}} = \frac{w_n^2}{w_Z}\frac{S + w_n}{S^2 + \frac{w_n}{Q}+w_n^2}$$

Figure 12:
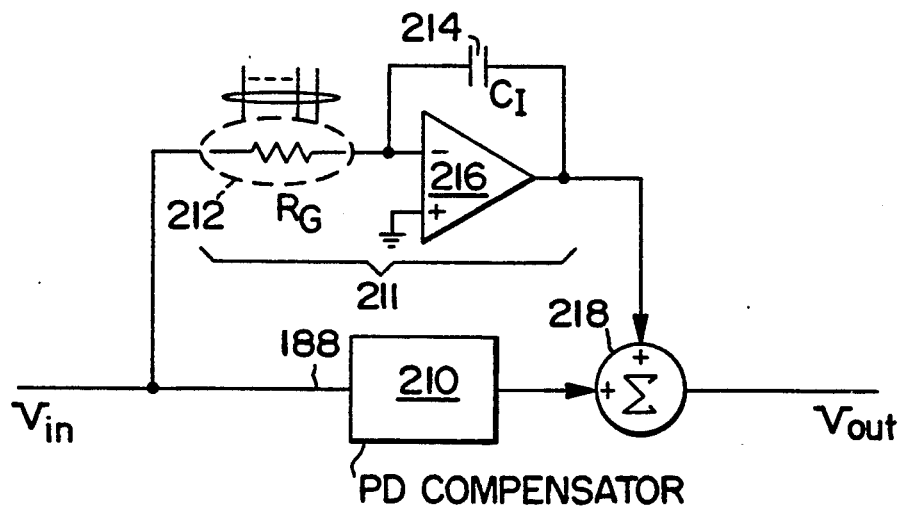
FIG. 12 shows a circuit diagram of a programmable discrete-time ASMC position-integration-differential (PID) compensator of this invention.

Referring now to the circuit of FIG. 12, the PD servo compensator of FIG. 11 is represented by the block 210. A standard integrator circuit 211 is composed of an integrating programmable switched-capacitor resistor 212 of value $R_G$, an integrating capacitor 214 of value $C_I$, and an operational amplifier 216. The inputs of the integrator 211 and the PD compensator 210 are connected together. The outputs of the integrator 211 and the PD compensator 210 are connected respectively to the two inputs of a summer 218 for forming a proportional-integration-derivative (PID) servo compensator of the parallel type.

The ASMC block 26 in co-processor of FIG. 3 is the PD compensator circuit of FIG. 11.

The PID circuit of FIG. 12 can be programmably constructed by the co-processor of FIG. 3. This is accomplished via the input switch/latch matrix 46 whereby the PD ASMC block 26 is connected with the integrator ASMC block 28 and the summing circuit block 34. The input and output of the PID circuit thus created are programmably connected to a co-processor input contact pad 52 and an output contact pad 68 respectively by matrices 46 and 66.

Analysis of the circuit of FIG. 12 leads to $$\frac{V_{out}}{V_{in}} = PD(S) + \frac{1}{R_G}\cdot\frac{1}{SC_I} = PD(S) - \frac{f_c C_R}{C_I S}$$

and using, for example the above given s-plane transfer function of the PD compensator of FIG. 11 leads to $$\frac{V_{out}}{V_{in}} = -\left[K_D S + K_P + K_I\frac{1}{S}\right]\frac{w_n^2}{S^2 + \frac{w_n}{Q}S + w_n^2}$$

wherein $w_n$ and Q are defined exactly as for the fourth PD compensator of FIG. 11, and wherein the parameters $$K_D = \frac{C_1 C_D C_I + C_R C_o^2}{f_c C_s^2 C_I},$$

-continued $$K_P = \frac{C_s C_I + C_Q C_R}{C_s C_I}, \text{ and}$$

$$K_I = \frac{f_c C_R}{C_I}.$$

This analysis reveals the fact that the transfer function of the circuit of FIG. 12 has the essential characteristics of a PID compensator, namely it is the sum of a proportional term $K_P$, an integrating term $K_I/S$, and a differential term $K_D S$. The rest of the transfer function is a classical biquad filter expression consisting of the ratio of two quadratics in S.

Filed concurrently herewith is applicant's application entitled PROGRAMMABLE PD SERVO COMPENSATOR, which describes and analyzes such PD and PID compensators in greater detail, and that application is incorporated by reference herein.

Integrated circuit servo co-processors, including all of the ASMC blocks described above, have been constructed and found to perform in accordance with the above transfer function analyses. They also are operable at sampling rates exceeding 1 MHz so that servo compensator speed is comparable to that of conventional analog-signal compensators, and much higher in comparison with conventional digital-signal processing compensators.

Since the discrete-time ASMC blocks, including switched-capacitor resistors, have transfer function parameters that are simply ratios of capacitances and the frequency at which the switched capacitor resistors are switched, the stability of this co-processor compensator, with respect to variations in manufacturing processes and with respect to operating temperature changes, are greatly enhanced and made comparable to the stability of digital-signal handling circuits.

The highly programmable servo compensator of this invention preferably employs MOS transistors and MOS capacitors, making possible a fully integratable circuit in silicon. With respect to power dissipation, analog circuit filters such as those described here can be designed with reduced power dissipation relative to comparable digital filter circuits. Also, this co-processor has an input switching matrix that can readily be adapted for deactivating and placing circuit blocks that are currently not needed in a sleep mode for further reducing integrated circuit power dissipation.

We claim:

1. A digitally programmable integrated circuit analog-signal servo co-processor comprising:
    a) a plurality of co-processor input contact pads, a plurality of co-processor output contact pads, and a plurality of co-processor digital-programming contact pads to which an external microprocessor may be connected, all said pads formed on said integrated circuit;
    b) a plurality of analog-signal-manipulating circuit (ASMC) means, each of said ASMC means having an input terminal, an output terminal, and a group of digital-programming terminals that are connected to a set of said co-processor digital-programming pads, each of said ASMC means being for accepting at said each ASMC input terminal an analog signal, for manipulating said analog input signal in analog form, and producing at said each ASMC output terminal an analog signal that is a particular analog-signal-manipulating function of the input analog signal, said particular analog-signal-manipulating function uniquely corresponding to a particular digital-programming signal that may be applied to said group of ASMC programming terminals,
    key ones of said ASMC means each being a discrete-time circuit including at least one switched-capacitor resistor, of the kind including a charge transferring capacitor and dual-phase clocked switches for simulating a linear ohmic resistor, and including at least one programmable capacitor array connected in the circuitry of said each ASMC means and to said corresponding group of ASMC programming terminals for effecting said particular analog-signal-manipulating function in response to the digital programming signal;
    c) an input switch-matrix means having
        a plurality of input-matrix analog-signal input terminals, some of said input-matrix input terminals connected to said co-processor input pads and a another group of said input-matrix input terminals connected respectively to said ASMC output terminals,
        a plurality of input-matrix output terminals respectively connected to said input terminals of said plurality of ASMC means, and
        a plurality of digital-signal input-matrix programming terminals, said input-switch-matrix means being for making switch connection between certain ones of said input-matrix analog-signal input terminals and particular ones of said input-matrix output terminals when a corresponding digital signal is applied to said input-matrix programming terminals; and
    d) an input digital-signal matrix-programming bus means for connecting said input-matrix programming terminals to a group of said co-processor digital-programming contact pads.

2. The programmable servo co-processor of claim 1 wherein one of said ASMC means is a dual programmable discrete-time integrator comprising: an operational amplifier having a negative input; an integrating resistor of the switched-capacitor type having one end connected to said amplifier input; an integrating capacitor connected between the output of said amplifier and said amplifier input, said amplifier output being connected to said integrator ASMC output terminal, the switched capacitor of said integrating switched-capacitor-resistor being a programmable capacitor array having a first group of digital-signal programming conductors connected to some of said ASMC programming terminals; a programmable voltage divider (PVD) having a second group of digitally programming conductors connected to others of said ASMC programming terminals, said PVD having an input connected to said ASMC input terminal and having an output connected to said other end of said switched-capacitor-resistor, so that the transfer function of the integrator contains the product of a parameter M and a parameter N that are functions respectively of the digital signals applied to said ASMC digital-programming terminals.

3. The programmable servo co-processor of claim 1 wherein one of said ASMC means is a discrete-time notch filter circuit comprising:
    a) first and second operational amplifiers;

b) first and second capacitors connected respectively between the output and the negative input of each of said first and second amplifiers;

c) a first of said switched-capacitor resistors connected between said ASMC input terminal and said first-amplifier input;

d) a second of said switched-capacitor resistors connected between said first amplifier output and said second amplifier input, said second-amplifier output connected to said ASMC output terminal;

e) a third of said switched-capacitor resistors connected between said ASMC output terminal and said first amplifier input;

f) a first of said programmable capacitor arrays connected in parallel with said third switched-capacitor resistor;

g) a third capacitor connected between second-amplifier input and said ASMC input terminal, and h) a second of said programmable capacitor arrays connected in parallel with said first switched-capacitor resistor, so that a change only in the capacitance of said second capacitor array causes a corresponding change in the filter notch depth and a change only in the capacitance of said first capacitor array causes a corresponding change in the filter notch width.

4. The notch filter of claim 3 wherein said first, second and third capacitors have the same capacitance values so that the Q of said notch-filter is equal to the ratio of said same capacitance value and the capacitance value of said first capacitor array.

5. The notch filter of claim 3 wherein said first and second capacitor arrays having first and second groups of digital-programming conductors connected in parallel to the same ones of said ASMC programming terminals for making the ratio of the capacitance values of said first and second arrays constant for all digital-programming input signals that may be applied to said some-ones ASMC programming terminals.

6. The notch filter of claim 5 additionally comprising a programmable voltage divider (PVD) having an input connected to said ASMC input terminal, having an output connected to said first amplifier output, and having a group of digital-programming conductors connected to others of said ASMC programming terminals.

7. The programmable servo co-processor of claim 1 wherein one of said ASMC means is a digitally programmable discrete-time analog-signal proportional-derivative (PD) servo compensator consisting of a biquad filter having a single complex zero and a pair of conjugate complex poles, said biquad filter comprising:

a) a first and second operational amplifier;

b) a first capacitor connected across said first amplifier, input to output;

c) a second capacitor connected across said second amplifier, input to output;

d) a first of said switched-capacitor resistors connected between said ASMC input terminal and the input of said first amplifier;

e) a second of said switched-capacitor resistors connected between the output of said first amplifier and the input of said second amplifier;

f) a third of said switched-capacitor resistors connected between said output of said second amplifier and said input of said first amplifier;

g) a poles Q-programming circuit means consisting of a circuit branch including one of said digitally-programmable capacitor arrays connected in said filter for determining the Q of said pair of poles and thus the bandwidth of said filter; and h) a zero programming circuit means consisting of a circuit branch including another of said digitally-programmable capacitor arrays connected in said filter for determining the S-plane position of said zero and determining the relative gains of the proportional and derivative components of the PD compensator output signal.

8. The programmable servo compensator of claim 7 wherein said circuit branch of said poles Q-programming circuit means is composed of said one digitally-programmable capacitor array, said poles Q-programming circuit means connected between said first amplifier input and said second amplifier output.

9. The programmable servo compensator of claim 7 wherein said circuit branch of said poles Q-programming circuit means is comprised of said one switched-capacitor resistor having a switched capacitor that is said one digitally programmable capacitor array, said poles Q-programming circuit means connected between said input and output of said second amplifier.

10. The programmable servo compensator of claim 7 wherein said zero programming circuit means is comprised of one of said switched-capacitor resistors having a switched capacitor that is said another digitally programmable capacitor array, said zero programming circuit means connected between said ASMC input terminal and said second amplifier input.

11. The programmable servo compensator of claim 7 wherein said zero programming circuit means is comprised of a digitally programmable capacitor array connected in parallel with said first resistor.

12. The programmable servo co-processor of claim 1 wherein said at least one switched-capacitor resistor means includes said at least one capacitor array for effecting said particular analog-signal-manipulating function in response to the uniquely corresponding digital-programming signal.

13. The servo processor of claim 1 wherein at least one of said ASMC means includes a programmable voltage divider (PVD) means, of the kind implemented by employing a standard DAC switches-and-resistors network connected for operation in voltage mode in the circuitry of said ASMC means, having PVD digital-programming terminals connected to said ASMC programming terminals for programmably causing the voltage-divider ratio of said PVD to assume one of many possible values and for effecting said particular analog-signal-manipulating function in response to the uniquely corresponding digital programming signal.

14. The servo processor of claim 1 additionally comprising a digital to analog converter (DAC), and wherein the connection, between one of said co-processor input contact pads and one of said input-matrix input terminals is effected by the connection therebetween of said DAC.

15. The servo processor of claim 1 additionally comprising an output switch-matrix means having a plurality of inputs connected respectively to said ASMC outputs, a plurality of outputs connected respectively to a group of said co-processor output pads, and a group of digital-programming conductors connected to another group of said co-processor digital-programming output contact pads, said second switch means for making switch connection between certain ones of said output-matrix inputs and particular ones of said output-matrix outputs when a corresponding digital signal is applied to said another group of co-processor programming contact pads.

* * * * *